Patented Oct. 28, 1924.

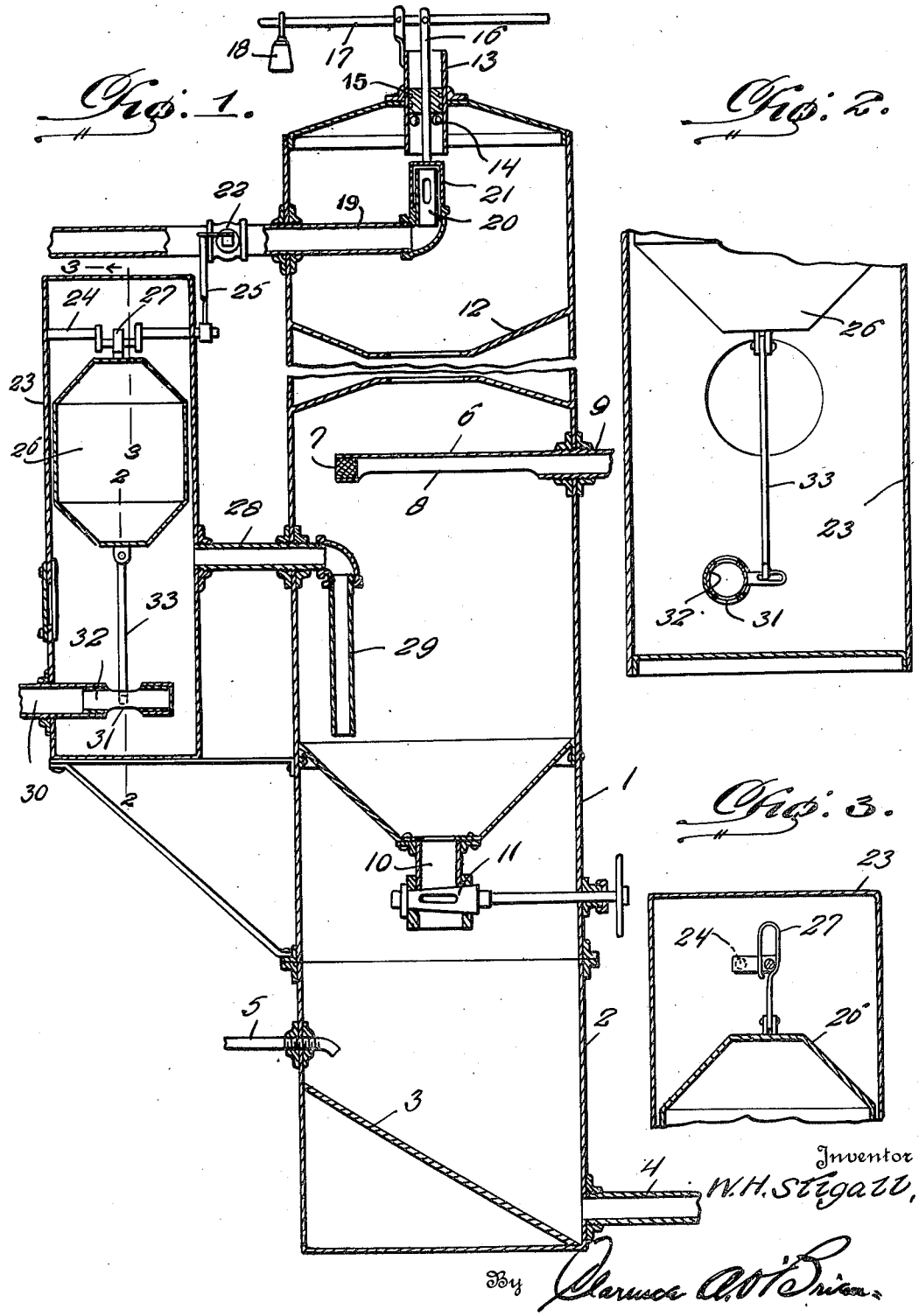

1,513,294

UNITED STATES PATENT OFFICE.

WILLIAM H. STIGALL, OF TAFT, CALIFORNIA.

APPARATUS FOR SEPARATING GAS, OIL, AND SAND.

Application filed May 7, 1924. Serial No. 711,696.

*To all whom it may concern:*

Be it known that I, WILLIAM H. STIGALL, a citizen of the United States, residing at Taft, in the county of Kern and State of California, have invented certain new and useful Improvements in an Apparatus for Separating Gas, Oil, and Sand, of which the following is a specification.

This invention relates to apparatus adapted for use in separating gas, oil, and sand, and it consists in the novel features hereinafter described and claimed.

An object of the invention is to provide apparatus of the character stated, and including a vertically disposed cylinder, with means for admitting the mixed gas, oil, and sand at a line between the upper and lower ends thereof, so that the gas may ascend within the cylinder, the sand may gravitate to the lower end thereof, and the oil may flow off at a point between the upper and lower ends thereof.

In the accompanying drawing:

Figure 1 is a vertical sectional view of the apparatus for separating gas, oil, and sand.

Figure 2 is a detailed sectional view of portions of the apparatus cut on the line 2—2 of Figure 1.

Figure 3 is a sectional view of portions of the apparatus cut on the line 3—3 of Figure 1.

The apparatus for separating gas, oil and sand, comprises a vertically disposed cylinder 1, which is mounted upon a hopper 2, having an inclined bottom 3, an outlet 4, and a water pipe 5 disposed therein, above the inclined bottom. A nipple 6 is located within the cylinder 1, at a line between the upper and lower ends thereof, and the said nipple is closed at its inner end as at 7, and is provided at its lower side with a longitudinally disposed slot 8. A pipe 9 communicates with the outer end of the nipple 6. The cylinder 1 is provided at its bottom with an outlet 10, the passageway through which is controlled by a valve 11. Baffle plates 12 are located in the upper portion of the cylinder 1, above the nipple 6.

A sleeve 13 passes centrally through the top of the cylinder 1, and is provided at its side and below the top of the said cylinder with port holes 14. A piston 15 is slidably mounted in the sleeve 13, and a rod 16 passes through the center of the piston 15, and its ends project beyond the opposite ends of the sleeve 13. A lever 17 is fulcrumed upon the upper portion of the sleeve 13, and the upper end of the rod 16 is pivotally connected with said lever 17. A counter balanced weight 18 is movably mounted on the end portion of the lever 17. A pipe 19 passes through the side of the upper portion of the cylinder 1, and is provided at its inner end with an upstanding nipple 20. A sleeve or inverted cup valve 21 is carried at the lower end of the rod 16 and is adapted to move vertically along the nipple 20. At a point exteriorly of the cylinder 1, the pipe 19 is provided with a valve 22. A tank 23 is located exteriorly of the cylinder 1, and a crank shaft 24 is journalled in the upper portion of the tank. A link 25 operatively connects the crank shaft 24 with the stem of the valve 22. A float 26 is movably mounted in the tank 23, and is provided at its upper end with a loop 27, through which the crank of the shaft 24 passes. A pipe 28 passes transversely through the sides of the tank 23, and the cylinder 1, and the said pipe 28 connects at its inner end with a vertically disposed nipple 29 which is located below the nipple 6. A pipe 30 penetrates the side of the tank 23 at the lower portion thereof, and is provided with ports 31, the passageways through which are controlled by a rotary valve 32 located within the said pipe 30. A link rod 33 operatively connects the valve 32 with the float 26 hereinbefore described. The operation of the apparatus is as follows:

The mixed gas, oil, and sand enter the cylinder 1 through the pipe 9. When the mixed fluid enters the nipple 6, it precipitates through the slot 8, the sand falling to the bottom of the cylinder 1, and the oil descending into the lower portion of the cylinder. The gas ascends within the cylinder 1 and passes through the baffle plates 12 and enters the upper portion of the cylinder. The sand settles down into the outlet 10, and at intervals may be passed out of the cylinder 1, by opening the valve 11 and permitting it to fall into the hopper 2, and upon the inclined bottom wall 3 thereof. At intervals water is introduced into the hopper 2 through the pipe 5, and the accumulated sand is flushed from the hopper thru the outlet pipe 4.

As the level of the oil, which is accumulated in the cylinder 1 elevates, and the oil covers the nipple 29 and the inner end of the pipe 28, the said oil will flow through the said nipple and pipe into the tank 23. At such time the float 26 is in a lowered position in the tank 23 and the oil passes through the port 31, into the pipe 30, and out of the tank 23. However, should the passage of the oil through the pipe 30 be interrupted, the oil will accumulate in the tank 23, and move the float 26 in an upward direction, whereby the link rods 33 will pull the valve 32 to a closed position over the port 31, in the pipe 30. At the same time, the link 27 swings the crank shaft 24, whereby the link 25 is moved, and the valve 22 in the pipe 19 is closed. This prevents the oil from accumulating in the cylinder 1, and flowing over and through the nipple 20, and escaping from the cylinder 1, through the gas pipe 19.

When the oil is flowing properly through the pipes 28 and 30, and the valve 22 in the pipe 19 is opened, the gas ascends in the cylinder 1, and bears against the under side of the piston 15, whereby the said piston is elevated in the sleeve 13, and the cup valve 21 is lifted above the upper end of the nipple 20. Therefore, the gas may pass through the said nipple and the pipe 19, out of the cylinder 1. When the volume of gas in the cylinder 1 is depleted, the piston 15, and the cup valve 21 descend by gravity, and the upper end of the nipple 20 is closed.

Having described the invention, what is claimed is:

1. An aparatus for separating gas, oil and sand, comprising a vertically erected cylinder having at its lower end a valve controlled opening, means for introducing the mixed gas, oil, and sand into the cylinder at a point between the ends thereof, a tank erected adjacent the cylinder, a pipe communicating with the tank and the cylinder, a downwardly disposed nipple housed within the cylinder and connected with the said pipe, a float located in the tank, an outlet pipe entering the tank, a valve located in said outlet pipe and connected with the float, a pipe for leading the gas from the upper portion of the cylinder, a valve controlling the passageway through said gas pipe, and means operatively connecting the last mentioned valve with the float.

2. An apparatus for separating gas, oil, and sand comprising a vertically erected cylinder provided at its lower end with a valve controlled outlet, means for introducing the mixed gas, oil, and sand, into the cylinder at a point between the upper and lower ends thereof, a tank arranged adjacent the cylinder, a pipe communicating with the interiors of the tank and the cylinder, at a point below the mixture introducing means, a float mounted in the tank, an outlet pipe communicating with the interior of the tank and having ports, a valve located in said outlet pipe and arranged to control the passageway through the port, means operatively connecting said valve with the float, a pipe communicating with the interior of the cylinder, and at the upper portion thereof, and having an upstanding nipple, a valve located in said pipe and operatively connected with the float, a piston movably mounted in the upper portion of the cylinder, and a cup valve carried by said piston and movably disposed about the nipple which is carried by the gas pipe.

In testimony whereof I affix my signature.

WILLIAM H. STIGALL.